US 6,532,235 B1

(12) United States Patent
Benson et al.

(10) Patent No.: US 6,532,235 B1
(45) Date of Patent: Mar. 11, 2003

(54) METHOD AND TOOL FOR CALCULATING IMPACT OF VOICE TRAFFIC ON FAST PACKET NETWORKS

(75) Inventors: Harvey J. Benson, Highlands Ranch, CO (US); John F. Shortle, Boulder, CO (US)

(73) Assignee: Qwest Communication Int'l., Inc., Denver, CO (US)

( * ) Notice: Subject to any disclaimer, the term of this patent is extended or adjusted under 35 U.S.C. 154(b) by 0 days.

(21) Appl. No.: 09/222,064

(22) Filed: Dec. 29, 1998

(51) Int. Cl.[7] .............................. H04L 12/56; H04J 3/22
(52) U.S. Cl. ................. 370/395.1; 370/395.6; 370/465
(58) Field of Search ......................... 370/233, 60, 232, 370/230, 395, 234, 352, 386, 395.1, 395.4, 395.6, 395.64, 465, 466, 468, 470, 477

(56) References Cited

U.S. PATENT DOCUMENTS

| | | | | |
|---|---|---|---|---|
| 5,485,455 A | * | 1/1996 | Dobbins et al. | ............... 370/60 |
| 5,838,663 A | * | 11/1998 | Elwalid et al. | ............. 370/233 |
| 6,028,840 A | * | 2/2000 | Worster | ..................... 370/230 |
| 6,041,039 A | * | 3/2000 | Kilkki et al. | ............... 370/230 |
| 6,195,332 B1 | * | 2/2001 | Tang | ........................... 370/232 |

OTHER PUBLICATIONS

Network Computing: Mar. 15, 1997; www.NetworkComputing.com, 3 pgs.

* cited by examiner

Primary Examiner—Hassan Kizou
Assistant Examiner—Saba Tsegaye
(74) Attorney, Agent, or Firm—Marsh Fischmann & Breyfogle LLP

(57) ABSTRACT

An analysis method provides a bandwidth calculation for employing voice communications over fast packet (FP) networks such as frame relay or ATM. Many companies currently have internal phone systems such as private branch exchange (PBX), which provide for the transmission of voice communication within an enterprise, but also a connection to the public switch telephone network (PSTN). In addition, PBX systems may be interconnected via a system of inter-PBX tie trunks, generally used for internal PBX-PBX communication. If a PBX system employs a private data network utilizing FP technology such as frame relay, it is now possible to route this inter-PBX voice traffic over the data network. In situations where the data network is a FP network such as frame relay or ATM, an analysis is performed to determine whether there is sufficient bandwidth to handle the voice traffic. A software tool uses historical data on the telephone network to calculate an equivalent number of trunks necessary in order to handle the voice traffic. Once this equivalent number of trunks is known, it is combined with other factors in order to calculate a bandwidth.

13 Claims, 4 Drawing Sheets

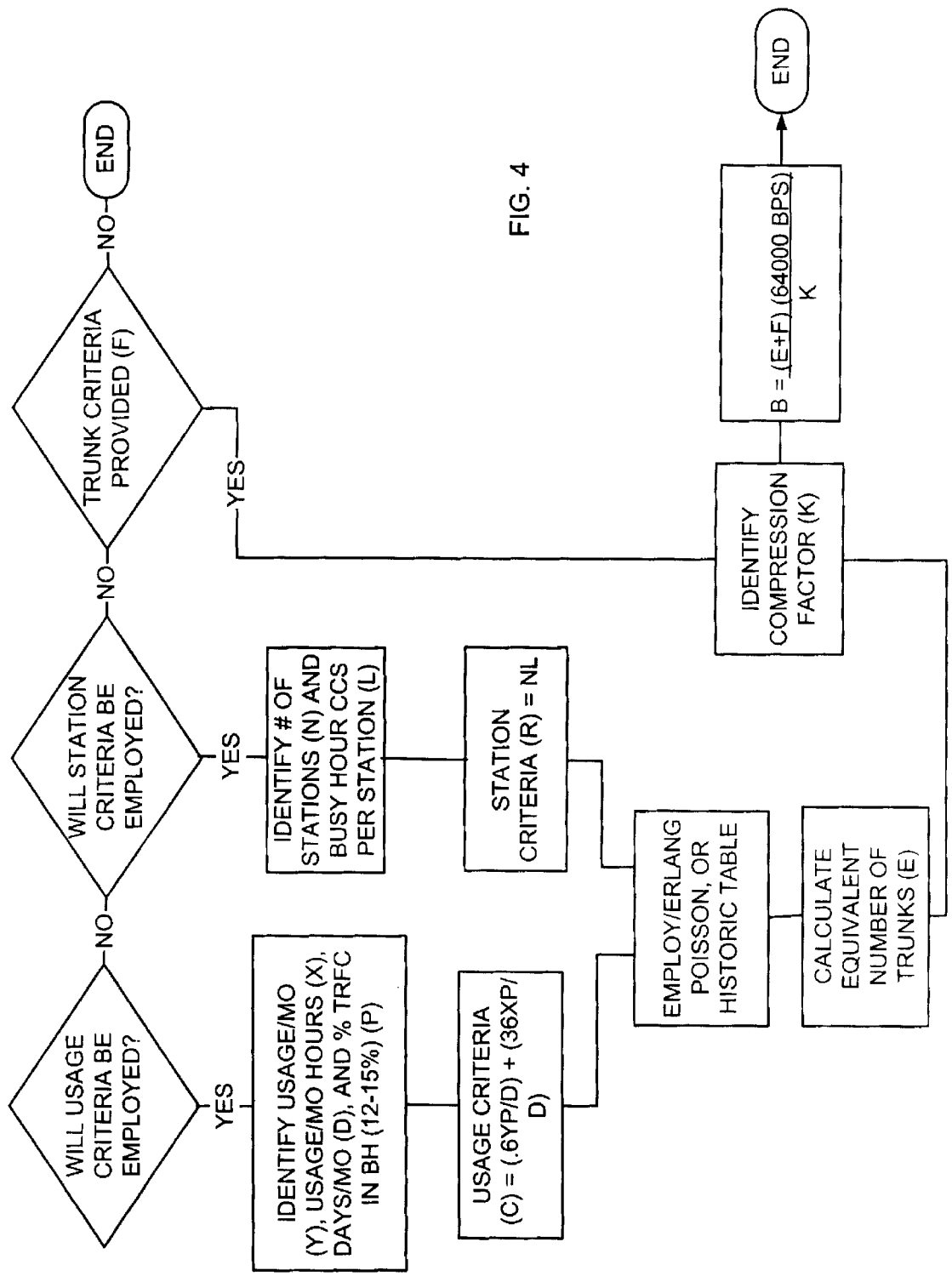

METHOD AND TOOL FOR CALCULATING IMPACT OF VOICE TRAFFIC ON FAST PACKET NETWORKS

FIELD OF THE INVENTION

Present invention relates to a method for analyzing a telecommunications system and more specifically to a method for determining available bandwidth in a fast packet network for including voice traffic.

BACKGROUND OF THE INVENTION

As the use of data networks has increased in recent times, a number of technologies have been developed to increase the speed at which data is transmitted. One technology is fast packet switching which provides the capability of transmitting data, digitized voice and digitized image information. It makes use of short, fixed length packets (or cells). The underlying switching technology is based on the statistical multiplexing of data and voice in fixed length cells. Any of these packets could carry digital voice, data or digital image information. Fast packet is an effective way of making best use of available bandwidth. It offers the benefits of conventional multiplexing techniques and circuit switching techniques. Fast packet switching may be performed in number of different ways. Two examples of this type of switching are frame relay and asynchronous transfer mode (ATM).

Frame relay is a frame-based transmission technique designed to create more efficient networks by permitting users to access only the amount of bandwidth they need for a given application. The frame relay is a "connection oriented" protocol. It establishes a logical connection for the duration of the transmission and may be implemented as a permanent virtual circuit (PVC) service. The frame relay network provides logical connectivity between geographically distributed devices, using special circuits, which can be multiplexed over a single access path. Disclosed in FIG. 1b is a portion of a data network which may be employed by an enterprise which incorporates the use of frame relay. The user interfaces receive and transmit information to the frame relay network 24 through the frame relay assembler-disassembler (FRAD) device 22.

ATM is a cell-based data transfer technique in which channel demand determines packet allocation. This network technology is based on transferring data in cells or packets of a fixed size. The cell used with ATM is relatively small compared to units used with other technologies. The small, constant cell size allows ATM equipment to transmit video, audio, and computer data over the same network, and assure that no single type of data occupies the majority of the available bandwidth.

One application for fast packet technology is in the area of telephony. Many businesses currently have their own internal phone system for routing internal calls. One type of internal system is the private branch exchange (PBX) which is a private phone network employed within an enterprise. Users of the PBX system share a certain number of outside lines for making and receiving calls external to the PBX system, while calls made within the system are simplified because the number used to connect is typically just three or four digits. Disclosed in FIG. 1a is a typical PBX phone system which includes a number of telephones 10 connected to the line side of the PBX system 12 and network connections established to the trunk side. Additionally, there are PBX tie trunks which tie into other PBX systems which may be remotely located.

A variety of devices currently exist for providing the integration of voice traffic, typically facilitated by PBX systems into new and existing fast packet networks. Although fast packet networks were originally designed for the efficient transmission of high speed packet data only, advances in technology now allow the efficient transmission of voice traffic, typically compressed well below the traditional 56/64 kbps voice channel. Such arrangements allow, for example, a frame relay customer with multiple geographically dispersed locations to carry in-network voice traffic without the expense of accessing the PSTN and without the expense of accessing an interexchange long distance carrier.

SUMMARY OF THE INVENTION

The inventor has recognized that when combining a traditional voice network and a frame relay and/or a asynchronous transfer mode (ATM) system, certain tools may be required in order to perform analysis to determine if the network is capable of carrying voice traffic. Described herein is a systematic approach for converting a quantified voice traffic volume expressed in terms of hours or minutes or usage per defined period of time or busy hour Centum Calling Seconds (CCS) into an equivalent frame relay or ATM packet data payload.

In the invention described herein, a method is disclosed for calculating the bandwidth necessary in order for a fast packet network such as a frame relay or an asynchronous transfer mode (ATM) system to carry voice traffic. The analysis for calculating bandwidth may be based upon input from three different sources. A first source may be usage criteria for the telephone system which is to employ the fast packet network. This criteria is predicated upon deriving a resultant packet bandwidth based upon input expressed in terms of time. These units of time may be minutes or hours of use per month. An additional factor for the usage criteria is the percentage of the customer's traffic which may appear during the busy hour, i.e. the time of the day when voice traffic may be the highest. These separate inputs may be mathematically combined in order to define a usage criteria.

Another input which may be used in the analysis is the station criteria. The station criteria may be the estimated or actual quantity of voice stations as input into a telephone system. The station criteria may be predicated upon deriving a resultant packet bandwidth based upon inputs expressed in terms of number of stations (telephones) originating and terminating telecommunications traffic and a determined volume of traffic usage per station during a particular period of time. A mathematical combination of these inputs may determine a station criteria.

The next step in determining the bandwidth is using either the usage or station criteria to determine an equivalent number of trunks for the telephone system. A number of different theorems may be applied to these input criteria such as Poisson, Erlang, or an historical table in order to convert the various usage or station criteria into an equivalent number of trunks. If the specifications of the telephone system at issue are known, a trunk criteria, which is the actual number of trunks, may be employed in the analysis.

Once the equivalent or actual number of trunks is known, it is now possible to determine a bandwidth which will be required in order for the fast packet network to carry voice communications. A compression factor is applied to the equation at this point and through this compression factor, an available bandwidth for the fast packet system is determined.

Numerous modifications and additions will be apparent to those skilled in the art upon further consideration of the invention.

BRIEF DESCRIPTION OF THE DRAWINGS

FIG. 4 is a flow chart that discloses the steps performed in the method of operation.

DETAILED DESCRIPTION

Figure 1A:
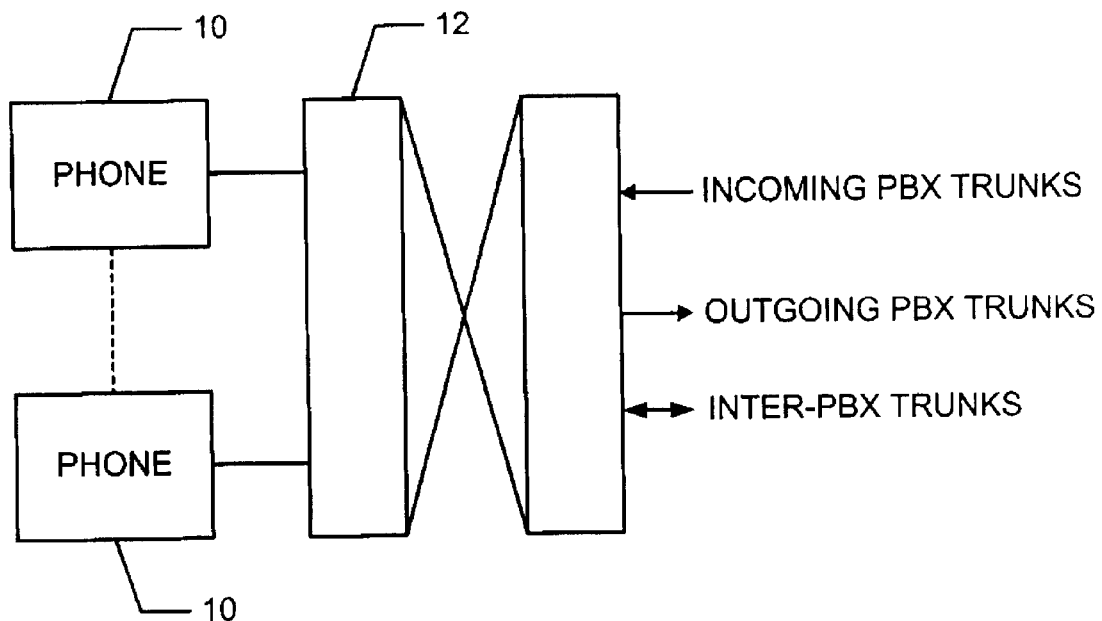
FIGS. 1a and 1b discloses prior art telephone and data transport systems.
Figure 1B:
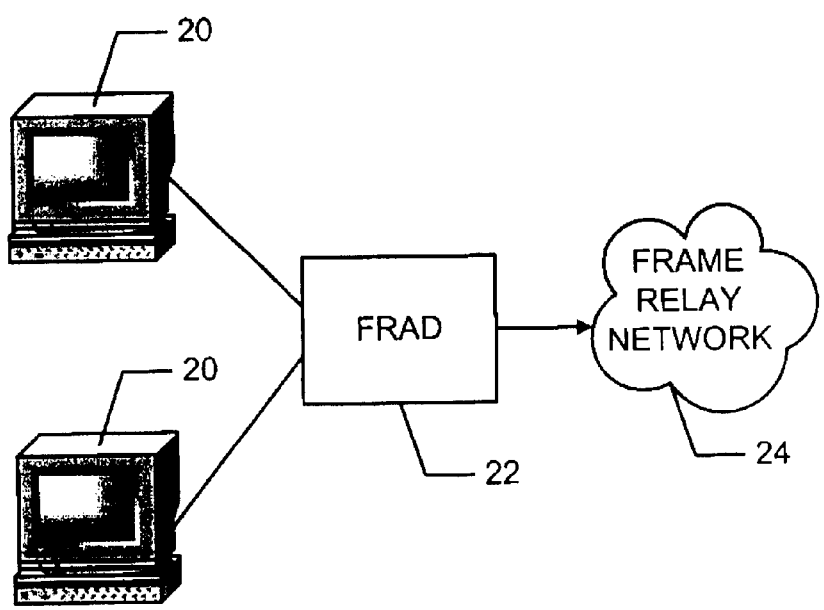
Figure 2:
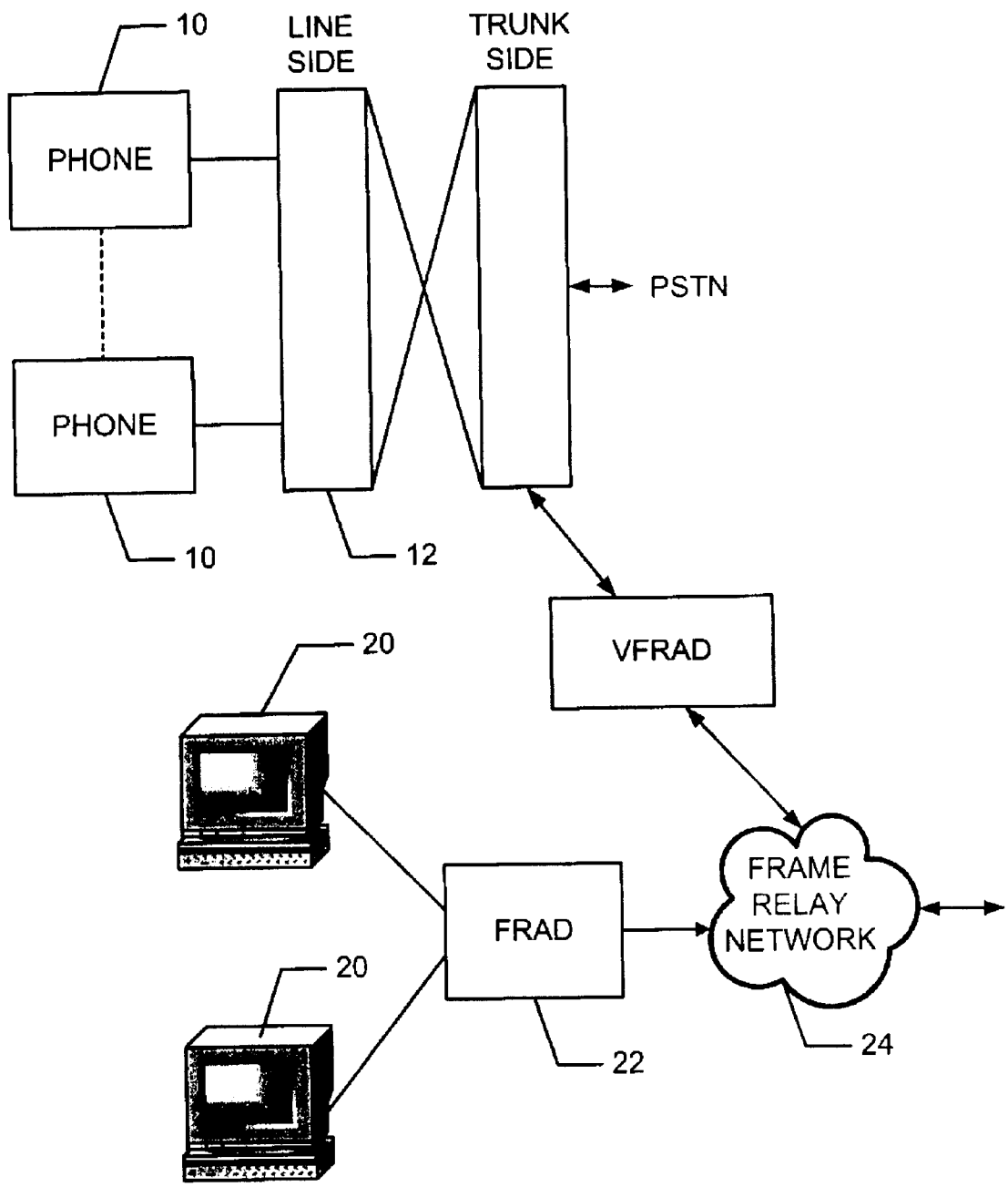
FIG. 2 discloses a fast packet communication system which incorporates both voice and data transmission.

Disclosed in FIG. 2 is a system diagram for a fast packet network which provides for the transmission and receipt of voice and data. Although the network is represented as a frame relay network, the description herein is meant to incorporate a "fast packet" data payload which implies the use of either frame relay or asynchronous mode (ATM) technologies. In the system, telephone lines are represented as connecting to the line side of a Private Branch Exchange (PBX) 12. On the trunk side of the PBX, connections are established to the public switched telephone network (PSTN). For transmissions of voice within the frame relay network, the voice frame relay assembler-disassembler (VFRAD) 32 provides for the conversion of the data such that it can be transmitted and received in a fast packet environment. Also connected to the frame relay network are data devices such as networked PC's 20. Data which is received and transmitted over the data network 24 is processed by the frame relay assembler-disassembler (FRAD) 22.

The present invention is an automated software tool which brings traditional voice network and emerging fast packets (frame relay and/or ATM) network design engineering disciplines together. One of the design requirements for establishing a voice network is that the voice data must be processed in real time, and no significant delays may occur in the transmission and receipt of this data. The addition of voice packet payload to an existing data network must not compromise the performance of the existing data network. In order to be sure that a network, such as the fast packet systems described herein, can process voice data in real time, an analysis must be performed to determine whether the system has sufficient bandwidth to handle the voice traffic, in addition to the data which is already being carried. One focus of the analysis is the capability to process the voice traffic at peak times. The automated software tool may be developed in any number of programming languages and operated on a computing apparatus, such as a personal computer, which includes the functionality to process the relevant programming language.

The process described herein converts quantified voice traffic volume expressed in terms of hours or minutes of usage per defined period of time, busy hour Centum Calling Seconds (CCS) or an established number of circuit switched voice trunks into an equivalent frame relay or ATM packet data load. The process addresses the problem of assessing the impact on a new or existing frame relay or ATM network when a defined volume of voice traffic, traditionally carried by the PSTN, is transitioned from the PSTN to the frame relay or ATM network.

The method described herein is a software tool that will allow input in a variety of formats to result in an output defining a fast packet data payload. As described below, inputs may be in the form of a number of equivalent voice trunks, hours or minutes of usage per defined time period, or busy hour CCS. Output may be expressed as an incremental bandwidth required to facilitate the voice traffic, sensitized by various optional voice compression ratios or compressed voice bandwidths.

Figure 3:
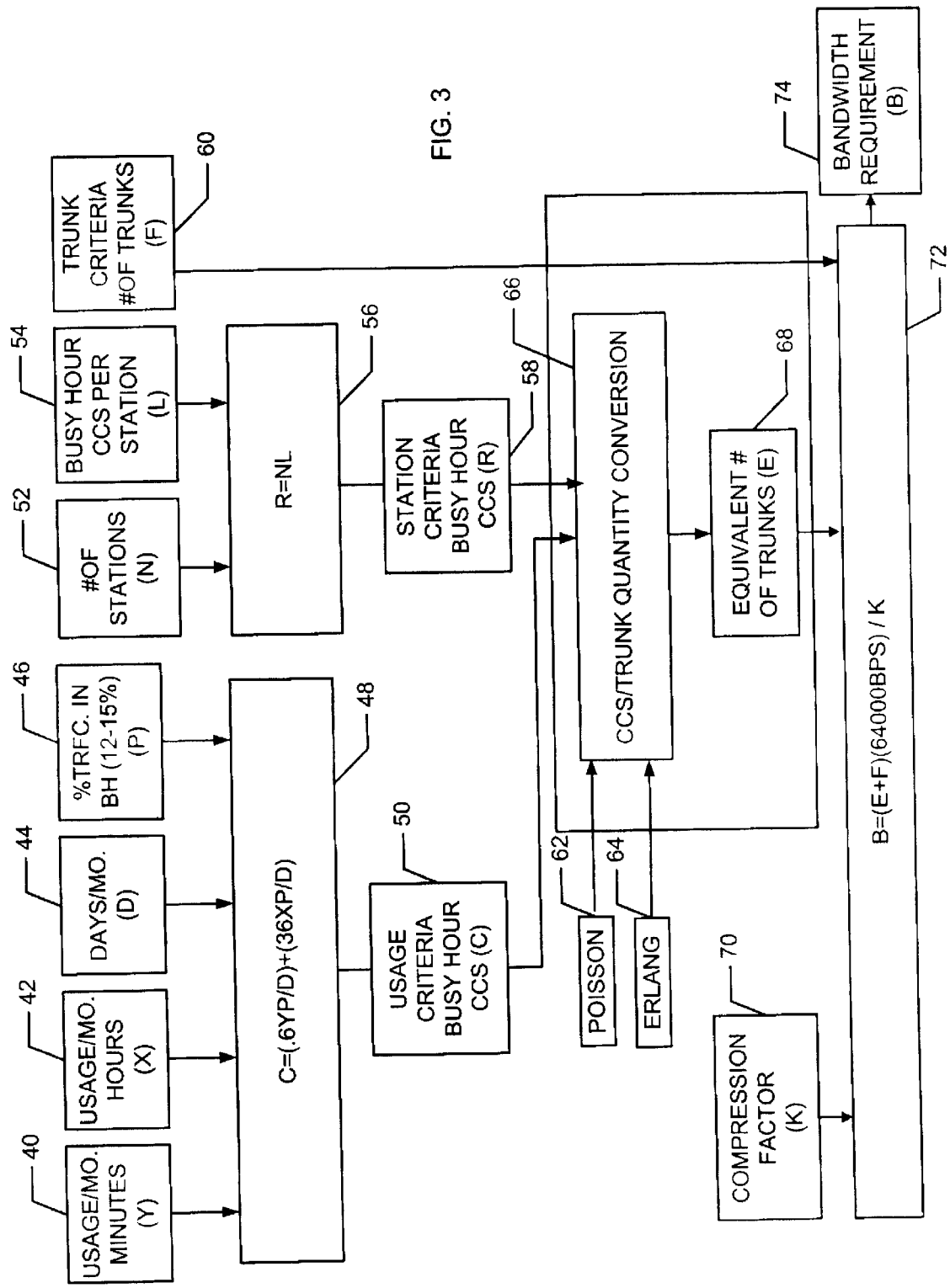
FIG. 3 discloses all the inputs for calculating the available bandwidth for voice traffic in the communications network.

Disclosed in FIG. 3 is a input diagram which describes in particular the different inputs used in order to perform the bandwidth analysis. As described below, at least three separate sources of information may be employed in order to make the bandwidth calculations. In each case, the input information will be processed to deliver a known or calculated quantity of "traditional" (64 kbps or analog) trunks to the bandwidth calculation. For a given calculation these three input sets are mutually exclusive.

A first input is usage criteria which is the estimated or actual (historical) minutes or hours of traffic usage per month input into the system. Usage criteria 50 is predicated upon deriving a resultant packet bandwidth based upon inputs expressed in terms of minutes or hours per use per month. These criteria are not uncommon in the interexchange carrier environment or in the design and administration of government networks. In the diagram of FIG. 3, items 40 and 42 are mutually exclusive and allow the input of minutes or hours of telecommunications usage in a monthly period. Item 44 allows the entry of an assumed number of days in a business month which may vary among customers. Typical entries may include 20, 22 or 30 depending upon an individual customers mode of network operation. Item 46 allows the entry of an assumption relative to the percentage of the customer's traffic that may appear in the busy hour, i.e. the time of the day when voice traffic is the highest. Typical entries may include 12% to 15%, with 15% being a reasonable default if more specific data is not available. These inputs are then used to calculate item 5 which is expressed by:

$$C=(0.6YP/D)+(36XP/D)$$

Where:
 Y=usage/month in minutes
 X=usage/month in hours
 D=Days
 P=TRFC in BH
 C is the approximate traffic load expressed in busy hours CCS (Centum, or 100 calling seconds, there are 36 CCS or 3,600 calling seconds in an hour).

The second type of information which may be input is the station criteria. Station criteria is the estimated or actual (historical) quantity of voice stations as input into the system. Station criteria is predicated upon deriving a resultant packet bandwidth based upon inputs expressed in terms of number of stations (telephones) originating and terminating telecommunications traffic and an actual, calculated or estimated volume of traffic usage per station in the busy hour. Item 52 allows the entry of stations as associated, for example, with a PBX system. Item 54 allows the entry of traffic usage per station in the busy hour based upon actual (historical) data or an estimated volume as characterized for a particular type of business. The input for item 54 may be expressed as:

$$R=NL$$

Where:
 N=the number of stations
 L=busy hour CCS per station

Item 56 (R) is the calculation of a total busy hour traffic load for the composite stations expressed in busy hour CCS.

Depending on the criteria employed, the resultant usage criteria 50 or station criteria 58 is presented to a trunk calculation process 66 where an equivalent quantity (E) output is determined using an historical traffic table or a formula utilizing traditional Poisson, Erlang or other appropriate industry traffic theorems. A Poisson distribution is a mathematical formula which indicates the probability of certain events occurring. It is used in traffic engineering to design telephone networks. It is one method of calculating how many trunks will be required in a network based on measurements of past calls. Poisson distribution describes how calls react when they encounter blockage. The Poisson formula assumes no blocked calls disappear, the user simply dials, redials and redials. Utilization of the Poisson method for a prediction will require more trunks than other methods which may be employed. Poisson typically overestimates the number of trunks required in a network, compared to other traffic engineering theorems.

The Erlang formula is a mathematical way of making predictions about randomly arriving work-load (such as telephone calls) based on new information (such as average call duration). The Erlang C formula was designed for telephone traffic handling for PBX and networks. This formula is especially used when traffic is random and there is queuing. It assumes that all callers wait indefinitely to get through. Therefore, offered traffic cannot be bigger than the number of trunks available (if it is, more traffic will come in than goes out and queue delay will become infinite). An Erlang is a measurement of telephone traffic. One Erlang is equal to one full hour of use or 60×60=3,600 seconds of phone conversation. The CCS is converted into Erlangs by multiplying by 100 and then dividing by 3,600. Through application of these formulas to either the usage or station criteria, the equivalent number of trunks needed to carry the projected phone traffic is calculated (E).

The historical traffic table is a compilation of information about the prior performance of the telephone network. The amount of usage is presented relative to the number of trunks necessary in order to handle the amount of activity.

Once the conversion is performed on the usage or station criteria using either the historical traffic table, Poisson, or Erlang, an equivalent number of trunks 68 will been determined. It is also conceivable that the information known about the current phone system includes information related to a number of equivalent trunks. If the existing quantity of analog or 64 kbps digital trunks that are to be transitioned to a fast packet environment is known, item 60 allows direct input of the equivalent number of trunks (F) to the bandwidth conversion calculation process.

Item 72 provides the calculation of the bandwidth by taking the trunk quantity and tempering this with a compression factor 70. The compression factor 70 is a variable which may have a different value for a frame relay environment versus an ATM environment. The bandwidth (B) is calculated using the following equation:

$$B=(E+F)(64{,}000 \text{ bps})/K$$

In the disclosed process, there will not be simultaneous values for E and F. A system user will choose what type of information to process with the tool. Once this choice is made the other input value will default to zero.

The above process is a designed to accommodate the transition of existing non-packetized voice circuits (trunks) to a fast packet environment, or to assess the impact of a theoretical non-packetized voice traffic load on an existing or proposed packet network. Information about an existing or proposed system would generally be available in a format characterized by one of the three input sets identified above.

Disclosed in FIG. 4 is a flow chart which describes in detail the processes followed by the automated software tool. As discussed above, a number of different types of information can be processed in order to make the bandwidth calculations. The first query made upon entry of information into the software tool, is whether the information pertains to usage criteria. If usage criteria is employed to make the bandwidth calculation, in the first step, the different types of usage information are identified such as usage/month minutes (Y), usage/month hours (X), days/month (D) as well as the percentage of traffic in busy hour (P). A calculation is then performed using these inputs to determine an approximate traffic load (C) expressed in busy hours CCS. Upon calculation of the traffic load, a conversion is performed on this value using inputs such as Poisson, Erlang or a historical table. After this conversion, an equivalent number of trunks is calculated. At this point a compression factor (K) is identified and the bandwidth is calculated in the final step.

Returning again to the first step of the process, if it is determined that the input information is not usage criteria, but instead station criteria, the first step is to identify the number of stations (N) and the busy hour CCS per station (L). Once these values are determined, a station criteria (R) can be determined by multiplying N times L. The equivalent number of trunks can then be determined by application of Erlang, Poisson, or an historical table. Once the equivalent number of trunks is determined, a relevant compression factor K can be applied and in the final step the bandwidth may be calculated.

If in the first step it is determined that neither the usage criteria or the station criteria are entered, the default entry is the actual trunk criteria (F). The input of this trunk criteria in conjunction with an identified compression factor (K) are then used to calculate a bandwidth value.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for calculating bandwidth needed on a fast packet network for receiving and transmitting voice communications, comprising the steps of:

identifying a selected criteria which is indicative of an amount of voice communication to be transmitted over the fast packet network;

converting said selected criteria into an equivalent number of communications trunks through application of a known communications standard; and calculating the bandwidth needed for receiving and transmitting the voice communication through a mathematical combination of the equivalent number of communications trunk, a conversion factor, and at least one constant.

2. The method of claim 1 wherein selected criteria is usage criteria determined over a predetermined period of time.

3. The method of claim 2 wherein the usage criteria includes: minutes of usage month (Y), hours of usage month (X), days per month (D), and percentage of traffic which occurs in busy time (P).

4. The method of claim 2 wherein the usage criteria (C) is determined by an equation: $C=(0.6YP/D)+(36XP/D)$.

5. The method of claim 1 wherein the selected criteria relates to usage per station.

6. The method of claim 5 wherein station criteria includes the number of stations (N) and busy hour CCS per station (L).

7. The method of claim 6 wherein the station criteria (R) is determined by a equation: $R=NL$.

8. The method of claim 1 wherein the known communications standard is at least one of: Poisson, Erlang, and a historical table.

9. The method of claim 1 wherein the at least one constant is a compression factor (K).

10. The method of claim 9 wherein bandwidth (B) is determined by the equation: $B=(E)(64000bps)/K$, E is the equivalent number of communications trunks.

11. The method of claim 1 wherein the voice communications originate from a PBX phone system.

12. The method of claim 1 wherein the fast packet network is a frame relay (FR) network.

13. The method of claim 1 wherein the fast packet network is an asynchronous mode (ATM) network.

* * * * *